United States Patent
Haruna

(10) Patent No.: US 10,981,282 B2
(45) Date of Patent: Apr. 20, 2021

(54) GRIPPING DEVICE

(71) Applicant: KOSMEK LTD., Kobe (JP)

(72) Inventor: Yosuke Haruna, Kobe (JP)

(73) Assignee: KOSMEK LTD., Kobe (JP)

( * ) Notice: Subject to any disclaimer, the term of this patent is extended or adjusted under 35 U.S.C. 154(b) by 5 days.

(21) Appl. No.: 16/619,169

(22) PCT Filed: May 29, 2018

(86) PCT No.: PCT/JP2018/020592
§ 371 (c)(1),
(2) Date: Dec. 4, 2019

(87) PCT Pub. No.: WO2018/235545
PCT Pub. Date: Dec. 27, 2018

(65) Prior Publication Data
US 2020/0156263 A1    May 21, 2020

(30) Foreign Application Priority Data

Jun. 20, 2017    (JP) .............................. JP2017-120899

(51) Int. Cl.
*B25J 15/04*    (2006.01)
*B25J 15/00*    (2006.01)

(52) U.S. Cl.
CPC ....... *B25J 15/0408* (2013.01); *B25J 15/0028* (2013.01)

(58) Field of Classification Search
CPC .... B25J 15/0408; B25J 15/0028; B25J 15/02; B25J 15/0009

(Continued)

(56) References Cited

U.S. PATENT DOCUMENTS

| 4,607,873 A * | 8/1986 | Nusbaumer | B25J 13/086 |
|---|---|---|---|
| | | | 294/106 |
| 5,125,708 A * | 6/1992 | Borcea | B65G 47/90 |
| | | | 294/119.1 |

(Continued)

FOREIGN PATENT DOCUMENTS

| JP | 2005 118958 A | 5/2010 |
| JP | 2016-030320 A | 3/2016 |

OTHER PUBLICATIONS

Search Report dated Dec. 22, 2020 issued in corresponding European application No. 18820418.4.

(Continued)

*Primary Examiner* — Paul T Chin
(74) *Attorney, Agent, or Firm* — Bacon & Thomas, PLLC

(57) ABSTRACT

An attaching-detaching mechanism (23, 63) of a gripping device includes: a tubular support member (44, 84) provided to a movable member (3, 4) to protrude in the guide hole (24, 64); engagement members (46, 86) respectively inserted in support holes (45, 85) of the support member (44, 84) so as to be radially movable; an operation portion (49, 89) inserted in a guide hole (24, 64); wedge portions (50, 90) provided on an inner peripheral wall of the operation portion (49, 89); a connecting rod (53, 93) provided to protrude from a claw member (22, 62) and configured to be insertable into a tubular hole (51, 91) of the support member (44, 84); and a lock portion (56, 96) provided on an outer peripheral wall of the connecting rod (53, 93).

6 Claims, 5 Drawing Sheets

(58) Field of Classification Search
USPC ......... 294/106, 119.1, 907, 207; 901/31, 36; 269/34
See application file for complete search history.

(56) References Cited

U.S. PATENT DOCUMENTS

| | | | | |
|---|---|---|---|---|
| 6,152,507 | A * | 11/2000 | Pirker | B65G 47/911 294/119.1 |
| 6,334,641 | B1 * | 1/2002 | Oh | H05K 13/0408 294/119.1 |
| 6,471,200 | B2 * | 10/2002 | Maffeis | B25B 5/087 269/234 |
| 6,827,381 | B1 * | 12/2004 | Reichert | B25J 15/028 294/119.1 |
| 6,830,273 | B2 * | 12/2004 | Michler | B23B 31/16237 294/119.1 |
| 7,976,087 | B2 * | 7/2011 | Maffeis | B25J 15/028 294/207 |
| 8,091,938 | B2 * | 1/2012 | Maffeis | B25J 15/028 294/207 |
| 10,843,311 | B2 * | 11/2020 | Kirsten | B25B 5/02 |
| 2003/0189349 | A1 * | 10/2003 | Risle | B25J 15/0253 294/207 |

OTHER PUBLICATIONS

Search Report dated Jul. 31, 2018 issued in corresponding International application No. PCT/JP2018/020592.

\* cited by examiner

GRIPPING DEVICE

TECHNICAL FIELD

The present invention relates to a device configured to grip a to-be-gripped object by moving a claw member in a left-right direction by a movable member. In particular, the present invention relates to such a gripping device including an attaching-detaching mechanism configured to detachably connect the claw members to the movable members.

BACKGROUND ART

Known examples of such a gripping device with the attaching-detaching mechanism include a device described in Patent Literature 1 (Japanese Unexamined Patent Publication No. 2016-030320). The known art is structured as follows.

A main body of the gripping device is attached to a distal end portion of an articulated arm of a robot. Two movable members are moved, by a driving means provided in the main body, in a direction in which the movable members come close to each other and in a direction in which the movable members go away from each other. A claw member is detachably connected to each movable member by an attaching-detaching mechanism. The attaching-detaching mechanism is structured as follows. A connecting rod provided to protrude downward from an under surface of the movable member. The connecting rod is configured to be insertable into an attachment hole provided at an upper portion of the claw member. A permanent magnet is attached to an upper end portion of the connecting rod. A to-be-attached portion, which is configured to be attracted by and attached to the permanent magnet, is provided on a peripheral wall of the attachment hole of the claw member. A radially extending support hole is provided at an outer peripheral wall of the connecting rod, and a compression spring and an engagement ball are attached into the support hole so as to be movable radially. The compression spring biases the engagement ball radially outward. The engagement ball is configured to be insertable into a recess provided at an inner peripheral wall of the attachment hole of the claw member. When the connecting rod is inserted into the attachment hole, the to-be-attached portion of the claw member is attracted by and attached to the permanent magnet of the connecting rod, and the engagement ball is engaged in the recess of the attachment hole. As a result, the connecting rod is connected to the claw member.

CITATION LIST

Patent Literature

Patent Literature 1: Japanese Unexamined Patent Publication No. 2016-030320

SUMMARY OF INVENTION

Technical Problem

The above-described known device has the following disadvantage.

There may be a case where, exceeding the force of the permanent magnet to keep the to-be-attached portion attached and the biasing force of the compression spring, some external force acts on the claw member in a direction in which the claw member is detached from the movable member. In this case, if the claw member is separated from the movable member even a slight distance, the force keeping the claw member attached decreases drastically, and the claw member is unintentionally detached from the movable member.

An object of the present invention is to provide a gripping device including an attaching-detaching mechanism capable of strongly connecting a claw member of a gripping device to a movable member.

Solution to Problem

In order to achieve the above object, in the present invention, a gripping device is structured as follows, as shown in FIG. 1 to FIG. 2B, for example.

A driving means 2 is provided in a main body 1 of the gripping device. A movable member 3, 4 provided at a leading end portion of the main body 1 is configured to be movable in a horizontal direction by the driving means 2. Between the movable member 3, 4 and a claw member 22, 62, an attaching-detaching mechanism 23, 63 is provided. The attaching-detaching mechanism 23, 63 is configured to detachably connect the claw member 22, 62 to the movable member 3, 4, and the claw member 22, 62 is configured to be contactable with a to-be-gripped object W. The attaching-detaching mechanism 23, 63 is structured as follows. A guide hole 24, 64 is provided to the movable member 3, 4 so as to extend in a direction crossing the horizontal direction. A tubular support member 44, 84 is provided to protrude from the movable member 3, 4 into the guide hole 24, 64. Support holes 45, 85 each radially passing through a tubular wall of the support member 44, 84 are provided at predetermined intervals in a circumferential direction. Engagement members 46, 86 are respectively inserted in the support holes 45, 85 so as to be radially movable. An operation portion 49, 89 is inserted in the guide hole 24, 64. The operation portion 49, 89 is configured to be movable in an axial direction by an attaching-detaching driving means 25, 65 provided in the movable member 3, 4. Wedge portions 50, 90 are provided on an inner peripheral wall of the operation portion 49, 89 so as to be engaged with the respective engagement members 46, 86. A connecting rod 53, 93 provided to protrude from the claw member 22, 62 is configured to be insertable into a tubular hole 51, 91 of the support member 44, 84. A lock portion 56, 96, provided on an outer peripheral wall of the connecting rod 53, 93 so that a distance between the lock portion 56, 96 and an axis of the connecting rod 53, 93 decreases toward a leading end side, is configured to be contactable with the engagement members 46, 86.

In the above aspect of the present invention, the following functions and effects are provided.

Suppose that, in the above-described gripping device, the claw member is connected to the movable member via the attaching-detaching mechanism. When some external force acts on the claw member in this state in a direction in which the claw member is separated from the movable member, friction between components of the attaching-detaching mechanism acts on the connecting rod as a counteractive force against the external force. Due to this, the external force is received by the operation portion via the connecting rod, the lock portion, the engagement members, and the wedge portions. As a result, unintentional detachment of the connecting rod from the tubular hole of the support member is prevented.

It is preferable to incorporate the following features into the above aspect of the present invention.

As shown in FIG. 1 to FIG. 2B, for example, a holding spring 41, 81 is provided in the guide hole 24, 64. The holding spring 41, 81 is configured to bias the engagement members 46, 86 radially inward via the operation portion 49, 89.

In this arrangement, if the attaching-detaching driving means cannot work for some reason, the holding spring pushes the lock portion of the connecting rod via the wedge portions of the operation portion and via the engagement members, and this maintains the connection between the claw member and the movable member.

It is preferable to incorporate the following features into the above aspect of the present invention.

As shown in FIG. 3A to FIG. 4B, for example, a protrusion 58, 98 is provided to either one of the movable member 3, 4 and the claw member 22, 62. Meanwhile, a recess 59, 99 into which the protrusion 58, 98 is to be fitted is provided to the other of the movable member 3, 4 and the claw member 22, 62.

In this arrangement, a driving force from the driving means for gripping is transmitted to the object via the protrusion and via the recess. This prevents wear of and/or damage to components of the attaching-detaching mechanism such as the connecting rod due to the driving force.

It is preferable to further incorporate the following feature into the above aspect of the present invention.

As shown in FIG. 3A, for example, the protrusion 58 has a cylindrical shape.

In this arrangement, it is possible to prevent wear of and/or damage to the components of the attaching-detaching mechanism such as the connecting rod.

It is preferable to further incorporate the following feature into the above aspect of the present invention.

As shown in FIG. 4A, for example, the protrusion 98 has a quadrangular shape.

In this arrangement, an external force (eccentric load) acting on the claw member in a direction in which the claw member is rotated within a horizontal plane is received by the movable member via the protrusion and via the recess. This prevents wear of and/or damage to the components of the attaching-detaching mechanism such as the connecting rod due to the external force.

It is preferable to incorporate the following features into the above aspect of the present invention.

As shown in FIG. 5A and FIG. 5B, for example, a guide projection 100 extending in a moving direction of the movable member 3, 4 is provided to either one of the movable member 3, 4 and the claw member 22, 62. Meanwhile, a groove 101, into which the guide projection 100 is to be fitted, is provided to the other of the movable member 3, 4 and the claw member 22, 62.

In this arrangement, an external force (eccentric load) acting on the claw member in a direction in which the claw member is rotated within a horizontal plane is received by the movable member via the guide projection and via the groove. This prevents wear of and/or damage to the components of the attaching-detaching mechanism such as the connecting rod due to the external force.

DESCRIPTION OF EMBODIMENTS

Figure 1:
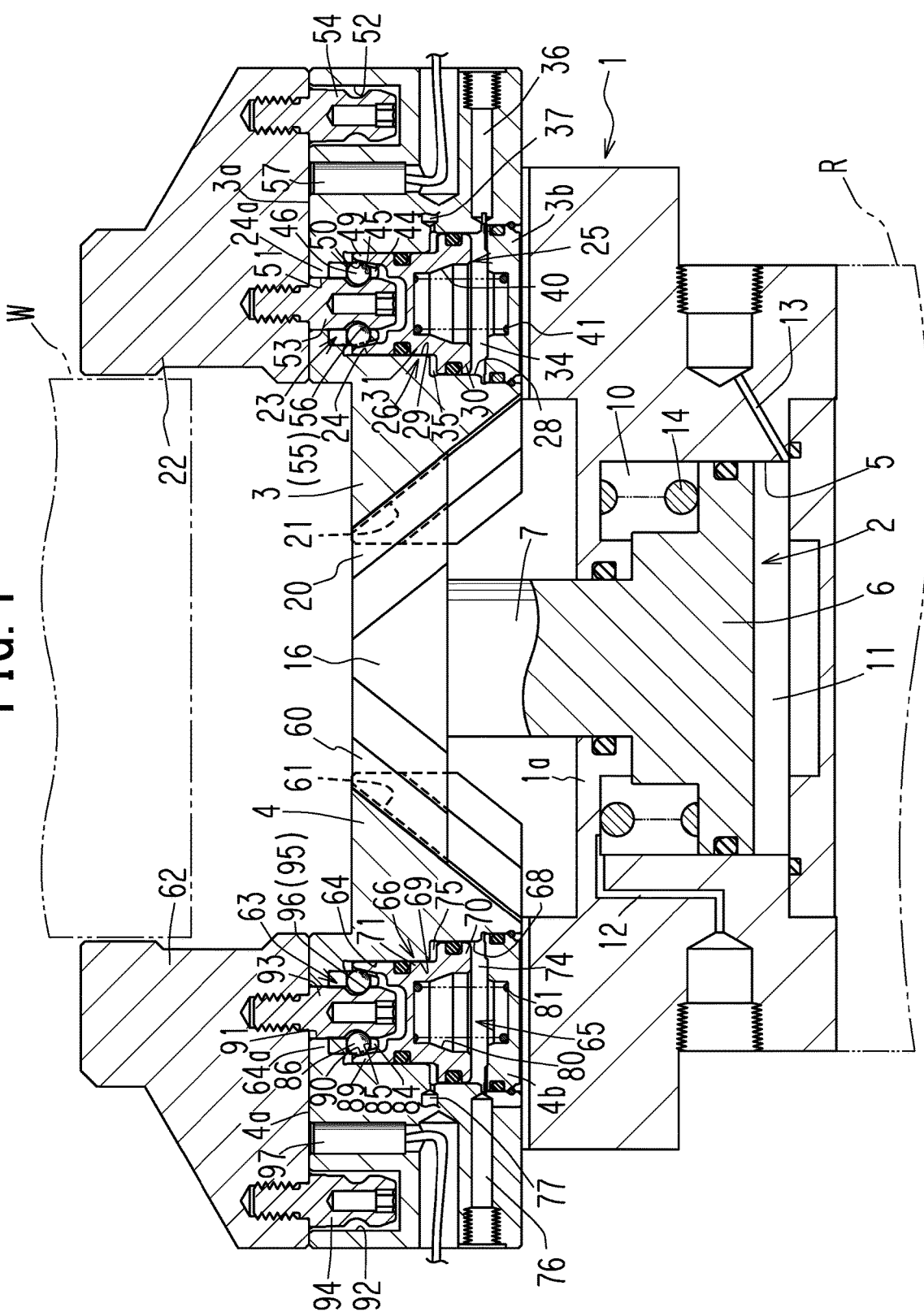
FIG. 1 shows an embodiment of the present invention and is a cross-sectional schematic diagram illustrating a gripping device including an attaching-detaching mechanism.
Figure 2B:
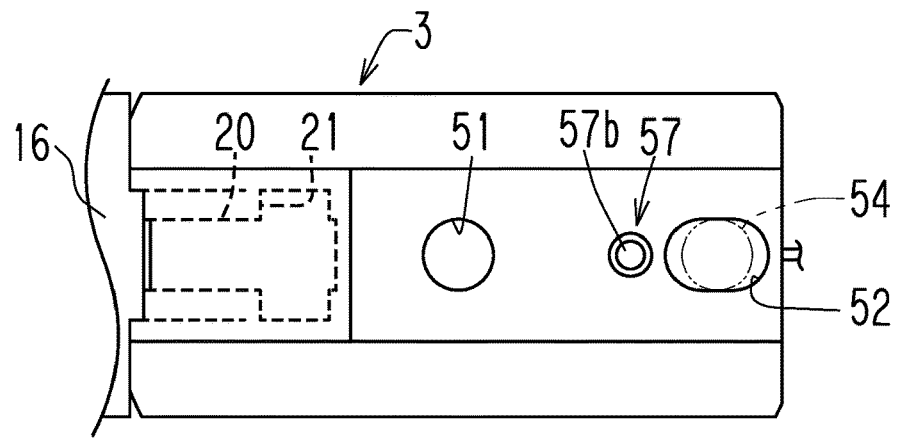
FIG. 2B is a cross section taken along a line 2B-2B in FIG. 2A.
Figure 2A:
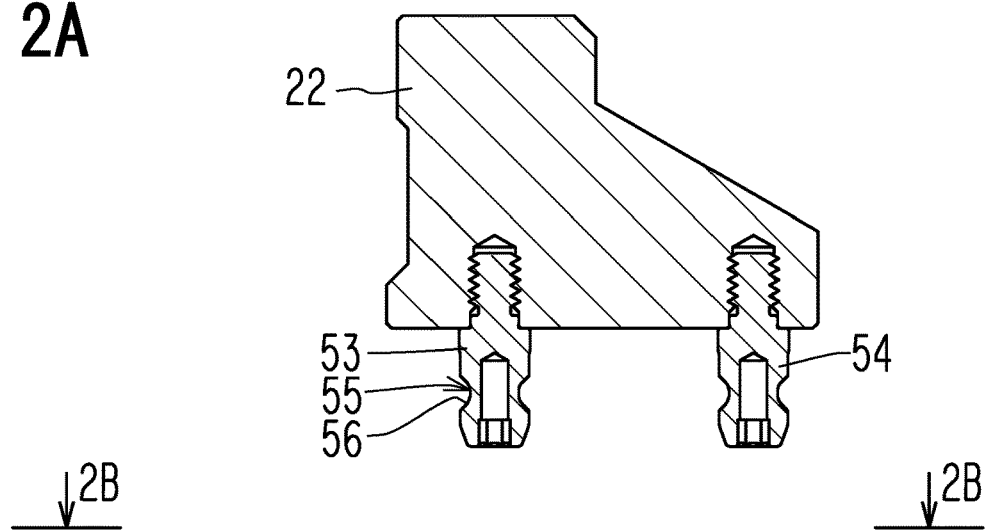
FIG. 2A is a cross-sectional partial view illustrating a release state of the attaching-detaching mechanism.
Figure 2A:
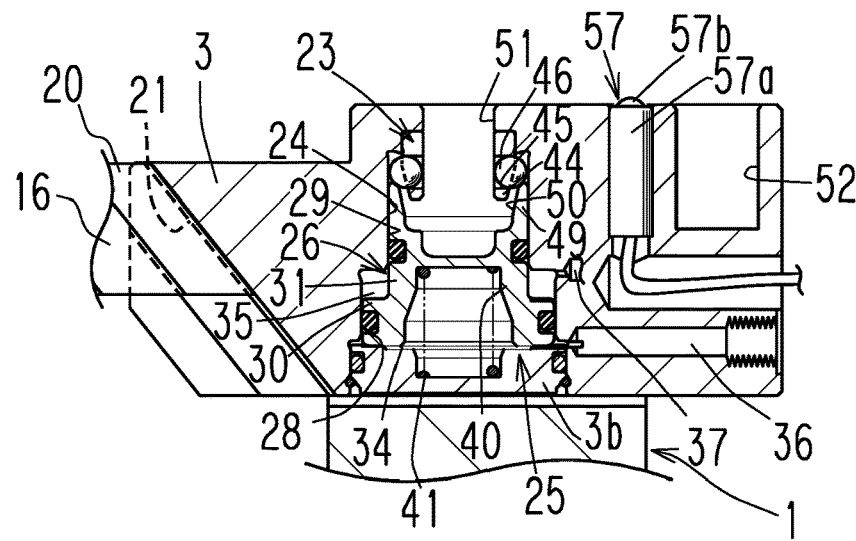

FIG. 1 to FIG. 2B show an embodiment of the present invention. This embodiment deals with, as an example, a gripping device configured to press a workpiece (to-be-gripped object) W from right and left. First of all, the structure of the gripping device will be described with reference to FIG. 1.

A main body 1 of the gripping device is fixed to an upper end portion (leading end portion) of an articulated robot R. A first movable member (movable member) 3 and a second movable member (movable member) 4 are configured to be moved in a horizontal direction by a driving means 2 provided in the main body 1 so that the movable members come close to each other or go away from each other.

The driving means 2 is structured as follows.

A piston 6 is hermetically inserted in a cylinder hole 5 so as to be movable in an up-down direction (axial direction). The cylinder hole 5 is provided in the main body 1 of the gripping device so as to extend in the up-down direction. An output rod 7 provided to protrude upward from the piston 6 is hermetically inserted in an upper wall 1a of the main body 1. A clamp chamber 10 is provided above the piston 6, and an unclamp chamber 11 is provided below the piston 6. A supply and discharge passage 12 through which compressed air (pressure fluid) is supplied to and discharged from the clamp chamber 10 is provided in the main body 1. Aside from this, a supply and discharge passage 13 through which compressed air is supplied to and discharged from the unclamp chamber 11 is provided. A holding spring 14 is attached in the clamp chamber 10, and the holding spring 14 biases the piston 6 downward relative to the upper wall 1a of the main body 1.

A cam member 16 is fixed to a leading end portion of the output rod 7. Two T-legs 20 and 60 are provided to an outer peripheral wall of the cam member 16 so that: the distance between the T-legs 20 and 60 decreases upward; and the T-legs 20 and 60 are left-right symmetric when viewed from the front. The first movable member 3 and the second movable member 4 are guided in the horizontal direction above the main body 1. The first T-leg 20 provided at a right wall of the cam member 16 is inserted into a first T-groove 21 provided at a left wall of the first movable member 3. The second T-leg 60 provided at a left wall of the cam member 16 is inserted into a second T-groove 61 provided at a right wall of the second movable member 4.

A first attaching-detaching mechanism 23 configured to detachably connect a first claw member (claw member) 22 to an upper portion of the first movable member 3 is provided between the first movable member 3 and the first claw member 22. A second attaching-detaching mechanism 63 configured to detachably connect a second claw member (claw member) 62 to an upper portion of the second movable member 4 is provided between the second movable member 4 and the second claw member 62. The first claw member 22 and the second claw member 62 are configured to be contactable with the workpiece W from the right and left.

In the first attaching-detaching mechanism 23, a cylinder hole 24 is provided in the first movable member 3 so as to extend in the up-down direction, and a first driving means 25 is provided in the cylinder hole 24.

Also in the second attaching-detaching mechanism 63, a second driving means 65 is provided in a cylinder hole 64 provided in the second movable member 4 so as to extend in the up-down direction.

The first driving means 25 of the first attaching-detaching mechanism 23 is structured as follows.

A piston 26 is hermetically inserted in the first cylinder hole 24 of the first movable member 3 so as to be movable in the up-down direction. The cylinder hole 24 has a large-diameter hole 28 and a small-diameter hole 29, which are arranged in this order from bottom to top. A large-diameter portion 30 of the piston 26 is hermetically inserted in the large-diameter hole 28, and a small-diameter portion 31 of the piston 26 is hermetically inserted in the small-diameter hole 29. A lock chamber 34 is provided below the piston 26, and a release chamber 35 is provided between the large-diameter hole 28 and the small-diameter portion 31. A supply and discharge passage 36 through which compressed air is supplied to and discharged from the lock chamber 34 is provided in the first movable member 3. Aside from this, a supply and discharge passage 37 through which compressed air is supplied to and discharged from the release chamber 35 is provided in the first movable member 3. An attachment hole 40 is provided at a lower portion of the piston 26, and a holding spring 41 is attached in the attachment hole 40. The holding spring 41 biases the piston 26 upward relative to a lower wall 3b of the first movable member 3.

The second driving means 65 of the second attaching-detaching mechanism 63 is structured similarly to the first driving means 25. That is, a piston 66 is hermetically inserted in the cylinder hole 64 of the second movable member 4 so as to be movable in the up-down direction. A large-diameter portion 70 of the piston 66 is hermetically inserted in a large-diameter hole 68 of the cylinder hole 64, and a small-diameter portion 71 of the piston 66 is hermetically inserted in a small-diameter hole 69 of the cylinder hole 64. Compressed air is supplied to and discharged from a lock chamber 74 through a supply and discharge passage 76. Aside from this, compressed air is supplied to and discharged from a release chamber 75 through a supply and discharge passage 77. A holding spring 81 is attached in an attachment hole 80 of the piston 66. The holding spring 81 biases the piston 66 upward relative to a lower wall 4b of the second movable member 4.

In the first attaching-detaching mechanism 23, a tubular support member 44 is provided to protrude downward from a ceiling wall 24a of the cylinder hole 24. Four radially extending support holes 45 are provided in a tubular wall of the support member 44 (two of the four support holes 45 are shown in FIG. 1 and FIG. 2A). Engagement balls (engagement members) 46 are respectively inserted in the support holes 45 so as to be radially movable. A tubular operation portion 49 is provided at an upper portion of the piston 26. The operation portion 49 is inserted in the cylinder hole (guide hole) 24. The operation portion 49 has, on its inner peripheral wall, grooves each extending in the up-down direction and each shaped so that its radial distance from an axis increases upward. A wedge surface (wedge portion) 50 is provided on a peripheral wall of each groove. The engagement balls 46 are configured to be contactable with the respective wedge surfaces 50.

Also in the second attaching-detaching mechanism 63, a tubular support member 84 is provided to protrude downward from a ceiling wall 64a of the cylinder hole 64. Radially extending support holes 85 are provided in a tubular wall of the support member 84. Engagement balls (engagement members) 86 are respectively inserted in the support holes 85 so as to be radially movable. Furthermore, a tubular operation portion 89 is provided at an upper portion of the piston 66. The operation portion 89 has, on its inner peripheral wall, grooves each extending in the up-down direction and each shaped so that its radial distance from an axis increases upward. Each engagement ball 86 is configured to be contactable with a corresponding wedge surface (wedge portion) 90 provided on a peripheral wall of the groove.

In the first attaching-detaching mechanism 23, an insertion hole 51 provided above the cylinder hole 24 and communicatively connected to the cylinder hole 24 opens onto a top surface 3a of the first movable member 3. An elongated hole 52 extending in the up-down direction is provided to the right of the insertion hole 51 with a predetermined distance therebetween. Furthermore, a connecting rod 53 and a pin 54 are provided to protrude downward from an under surface of the claw member 22. The connecting rod 53 is configured to be insertable into the insertion hole 51, and the pin 54 is configured to be insertable into the elongated hole 52. This prevents the claw member 22 from rotating relative to the first movable member 3. Furthermore, a lock groove 55 is provided in a circumferential direction on an outer peripheral wall of the connecting rod 53. A lock portion 56 is provided on a peripheral wall of the lock groove 55 so that the distance between the lock portion 56 and an axis of the connecting rod 53 decreases upward. The engagement balls 46 of the first attaching-detaching mechanism 23 are configured to be engageable with the lock portion 56. In this embodiment, the insertion hole 51 is structured by a tubular hole of the support member 44.

In the second attaching-detaching mechanism 63, an insertion hole 91 provided above the cylinder hole 64 and communicatively connected to the cylinder hole 64 opens onto a top surface 4a of the second movable member 4. An elongated hole 92 extending in the up-down direction is provided to the left of the insertion hole 91 with a predetermined distance therebetween. A connecting rod 93 of the second claw member 62 is configured to be insertable into the insertion hole 91, and a pin 94 is configured to be insertable into the elongated hole 92. This prevents the claw member 62 from rotating relative to the second movable member 4. Furthermore, the engagement balls 86 are configured to be engageable with a lock portion 96 of a lock groove 95 of the connecting rod 93. In this embodiment, the insertion hole 91 is structured by a tubular hole of the support member 84.

In the first attaching-detaching mechanism 23, a contact sensor 57 is disposed between the cylinder hole 24 and the elongated hole 52. The contact sensor 57 includes: a sensing portion 57b configured to protrude from the top surface 3a of the first movable member 3 in a release state; and a sensor main body 57a which houses therein the sensing portion 57b and is fitted in and fixed to the first movable member 3.

Also in the second attaching-detaching mechanism 63, a contact sensor 97 is disposed between the cylinder hole 64 and the elongated hole 92.

The first attaching-detaching mechanism 23 operates as follows, as shown in FIG. 1 and FIG. 2A.

In an initial state (release state) of the first attaching-detaching mechanism 23, which is shown in FIG. 2A, compressed air has been discharged from the lock chamber 34 and compressed air has been supplied to the release chamber 35. Due to this, downward pressing force corresponding to the compressed air in the release chamber 35 is exerted so as to move the piston 26 downward against the biasing force of the holding spring 41. This allows the engagement balls 46 to move radially outward in the support holes 45.

The first claw member 22 is brought from above to the gripping device by some conveyance mechanism. The connecting rod 53 of the first claw member 22 is inserted into the insertion hole 51, while the pin 54 of the first claw member 22 is inserted into the elongated hole 52 of the first movable member 3.

To cause the first attaching-detaching mechanism 23 to transition from the release state of FIG. 2A to a lock state of FIG. 1 for locking, compressed air in the release chamber 35 is discharged and compressed air is supplied to the lock chamber 34. As a result, first of all, the piston 26 is moved upward by virtue of the resultant of: the pushing force of the compressed air in the lock chamber 34 which pushes the piston 26 upward; and the upward biasing force of the holding spring 41. Subsequently, the wedge surfaces 50 of the operation portion 49 move the engagement balls 46 radially inward, and the engagement balls 46 are brought into contact with the lock portion 56 of the connecting rod 53. Then, as the piston 26 pulls the connecting rod 53 downward via the engagement balls 46, the under surface of the first claw member 22 is pressed against the top surface 3a of the first movable member 3. In this way, the state of the first attaching-detaching mechanism 23 is changed from the release state to the lock state. The lock state of the first attaching-detaching mechanism 23 is detected by the contact sensor 57.

To cause the first attaching-detaching mechanism 23 to transition from the lock state of FIG. 1 to the release state of FIG. 2A for releasing, compressed air in the lock chamber 34 is discharged and compressed air is supplied to the release chamber 35. As a result, first of all, the pushing force of the compressed air in the release chamber 35, which pushes the piston 26 downward, moves the piston 26 downward against the upward biasing force of the holding spring 41. Subsequently, gaps are created between the wedge surfaces 50 of the operation portion 49 and the engagement balls 46, respectively, and this allows the engagement balls 46 to move radially outward. In this way, the state of the first attaching-detaching mechanism 23 is changed from the lock state of FIG. 1 to the release state of FIG. 2A.

Because the second attaching-detaching mechanism 63 operates in the same way as the first attaching-detaching mechanism 23, the description thereof is not given here.

The gripping device operates as follows, as shown in FIG. 1.

In an unclamping state of the gripping device, which is shown in FIG. 1, compressed air (pressure fluid) has been discharged from the clamp chamber 10 in the main body 1, and compressed air has been supplied to the unclamp chamber 11. The compressed air in the unclamp chamber 11 has pushed and moved the piston 6 to its upper limit position against the holding spring 14.

To cause the gripping device to transition from the unclamping state of FIG. 1 to the clamping state of for clamping, compressed air in the unclamp chamber 11 is discharged and compressed air is supplied to the clamp chamber 10. As a result, first of all, the piston 6 is moved downward by the pushing force of the compressed air in the clamp chamber 10, which pushes the piston 6 downward, and by the downward biasing force of the holding spring 14. Then, the cam member 16 is moved downward. The cam member 16 moves the first movable member 3 leftward via the first T-leg 20 and via the first T-groove 21, and the cam member 16 also moves the second movable member 4 rightward via the second T-leg 60 and via the second T-groove 61. Due to this, the first claw member 22 is brought into contact with the workpiece W from the right, while the second claw member 62 is brought into contact with the workpiece W from the left.

The above-described embodiment provides the following advantages.

In a state where the first claw member 22 is attached to the first movable member 3 (connected state), the piston 26 of the first attaching-detaching mechanism 23 pulls the connecting rod 53 into the insertion hole 51 via the wedge surfaces 50, the engagement balls 46, and the lock portion 56, and therefore the first claw member 22 is strongly received by the top surface 3a of the first movable member 3. In this connected state, there may be a case where some upward external force acts on the connecting rod 53 of the first claw member 22. In this case, friction between the wedge surfaces 50 and the engagement balls 46 and friction between the engagement balls 46 and the lock portion 56 act on the first claw member 22 as a counteractive force against the upward external force. Due to this, the upward external force is received by the piston 26 via the wedge surfaces 50, the engagement balls 46, and the lock portion 56. As a result, unintentional detachment of the first claw member 22 from the movable member 3 can be prevented.

In a state where the second claw member 62 is attached to the second movable member 4 (connected state), the piston 66 of the second attaching-detaching mechanism 63 pulls the connecting rod 93 into the insertion hole 91 via the wedge surfaces 90, the engagement balls 86, and the lock portion 96, and therefore the second claw member 62 is strongly received by the top surface 4a of the second movable member 4. In this connected state, there may be a case where some upward external force acts on the connecting rod 93 of the second claw member 62. In this case, friction between the wedge surfaces 90 and the engagement balls 86 and friction between the engagement balls 86 and the lock portion 96 act on the second claw member 62 as a counteractive force against the upward external force. Due to this, the upward external force is received by the lock portion 96 via the wedge surfaces 90 and engagement balls 86. As a result, unintentional detachment of the second claw member 62 from the movable member 4 can be prevented.

Figure 3B:
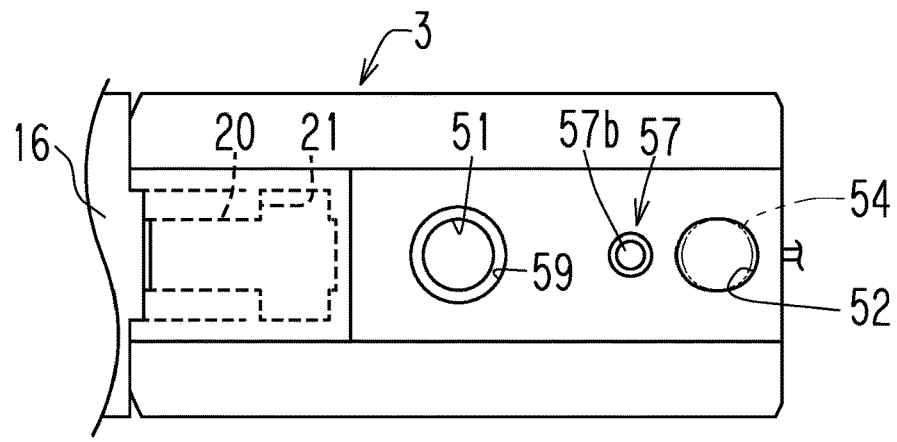
FIG. 3B is a cross section taken along a line 3B-3B in FIG. 3A.
Figure 3A:
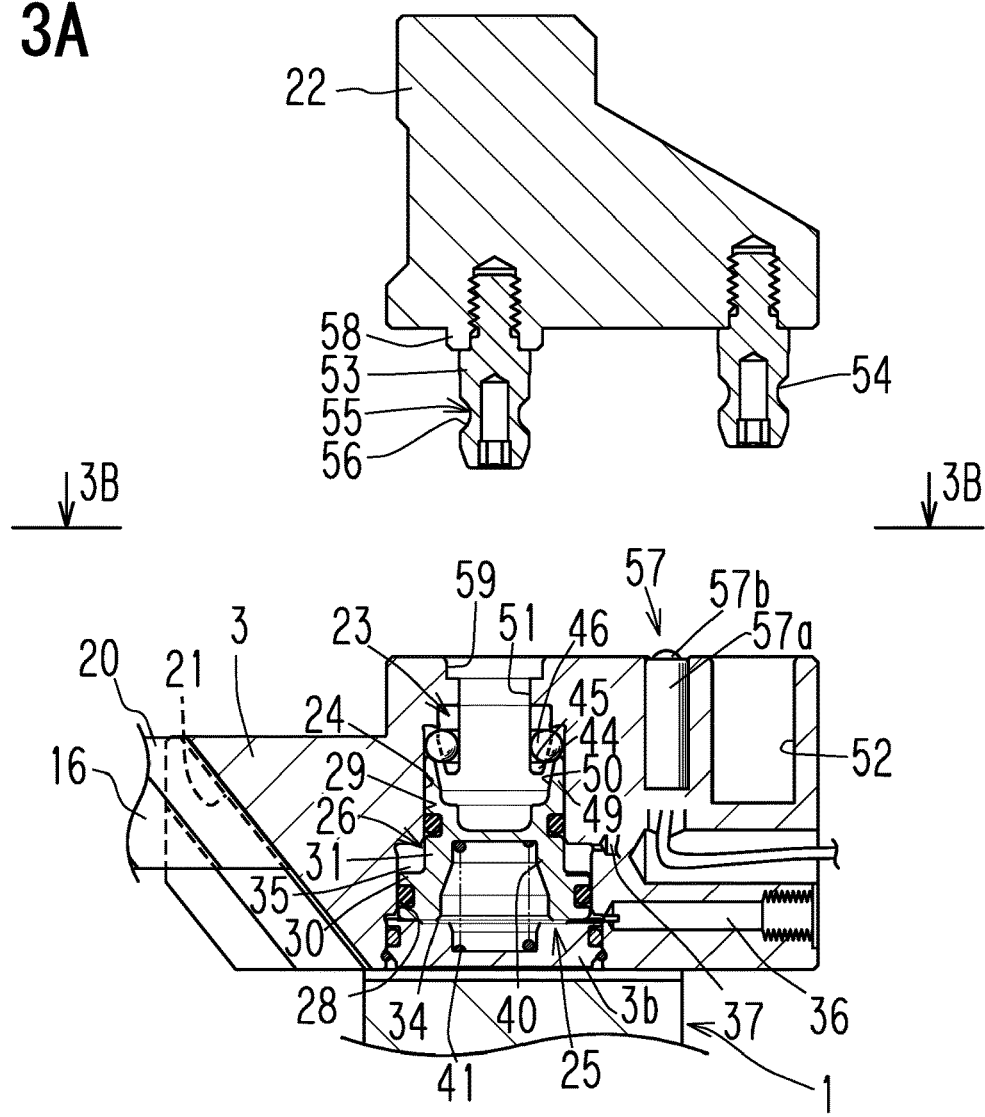
FIG. 3A is a diagram illustrating a modification of the above embodiment and corresponding to FIG. 2A.

FIG. 3A and FIG. 3B show a modification of the above-described embodiment of the present invention. In this modification, components the same as or similar to the components in the above-described embodiment are given the same reference numerals, in principle.

The modification shown in FIG. 3A and FIG. 3B is different from the above-described embodiment in the following points.

A cylindrical protrusion 58 is provided on the under surface of the first claw member 22, and the connecting rod 53 is provided to protrude downward from the protrusion 58. Meanwhile, a recess 59, into which the protrusion 58 is to be fitted, is provided on the top surface of the first movable member 3. In this modification, the recess 59 is provided above the cylinder hole 24. Furthermore, as shown in FIG.

3B, the recess 59 has a circular shape in a plan view. Note that the second attaching-detaching mechanism 63 has the same structures as above.

This modification provides the following advantages.

When the first claw member 22 is pressed towards a workpiece W, a driving force (pressing force) from the driving means 2 is transmitted to the workpiece W via the fitted protrusion 58 and recess 59. This prevents wear of and/or damage to components of the first attaching-detaching mechanism 23 such as the connecting rod 53 due to the driving force.

Figure 4B:
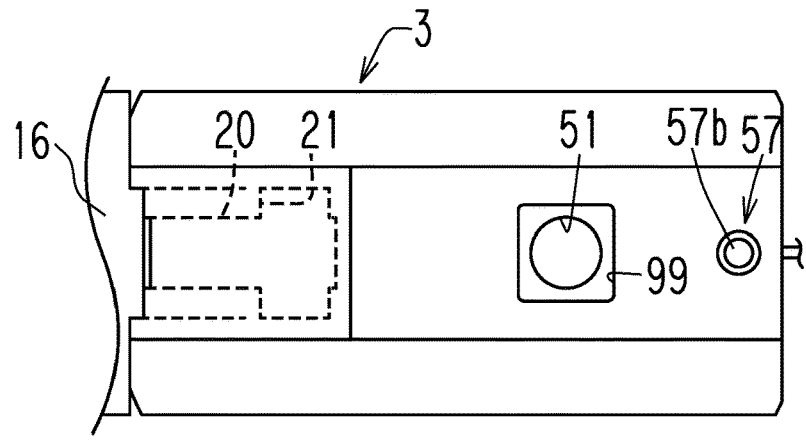
FIG. 4B is a cross section taken along a line 4B-4B in FIG. 4A.
Figure 4A:
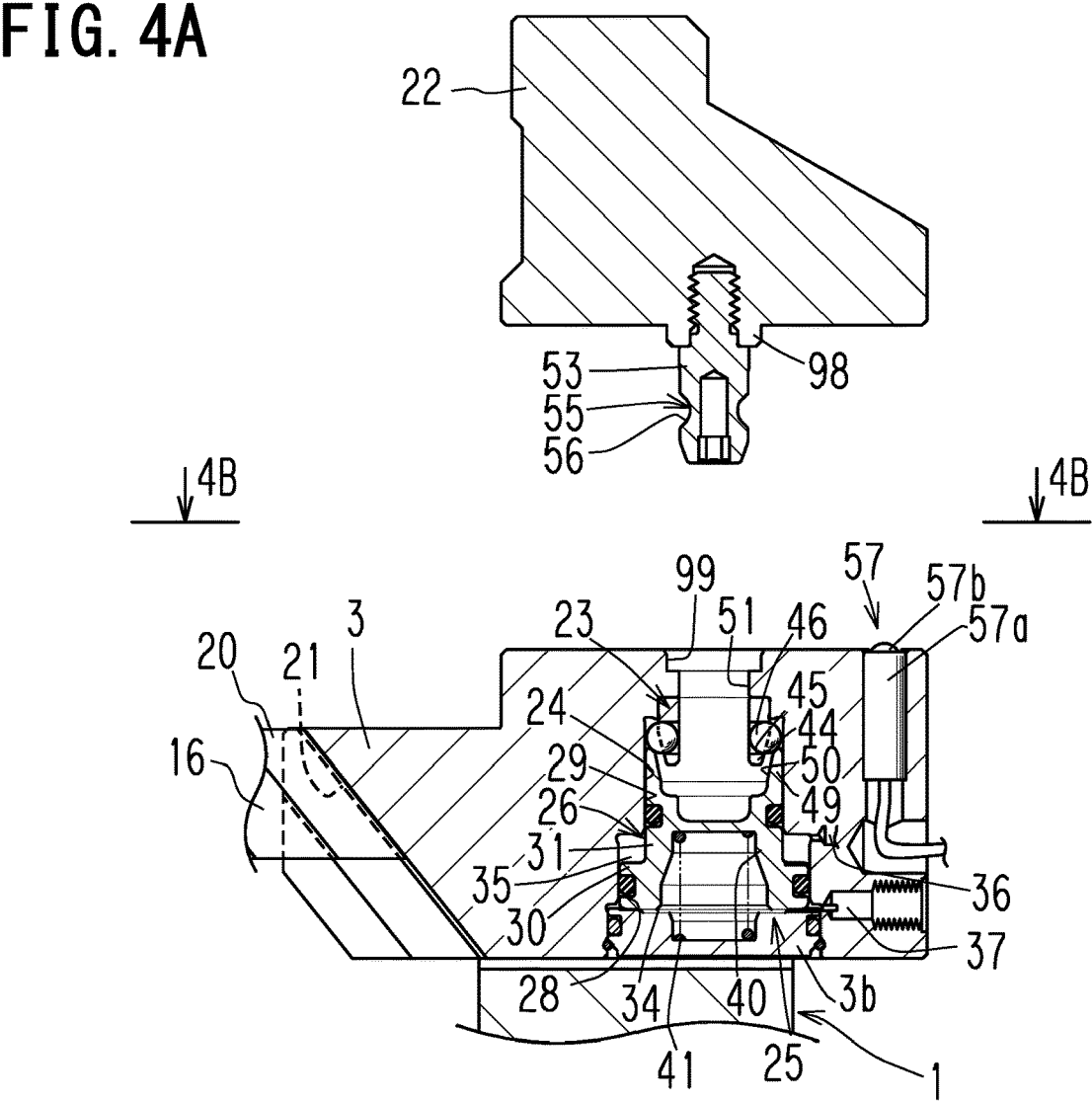
FIG. 4A is a diagram illustrating another modification of the above embodiment and corresponding to FIG. 2A.

FIG. 4A and FIG. 4B show another modification of the above-described embodiment of the present invention. In this modification, components the same as or similar to the components in the above-described embodiment are given the same reference numerals, in principle.

The modification shown in FIG. 4A and FIG. 4B is different from the modification shown in FIG. 3A and FIG. 3B in the following points.

In this modification, a protrusion 98 provided on the under surface of the first claw member 22 has a quadrangular shape. Furthermore, as shown in FIG. 4B, a recess 99 into which the protrusion 98 is fitted in has a quadrangular shape in a plan view. In addition, no pin 54 is provided to the first claw member 22. Due to the absence of the pin 54, no elongated hole 52 is provided in the first movable member 3. Note that the second attaching-detaching mechanism 63 has the same structures as above.

This modification provides the following advantages, in addition to the advantages provided by the modification shown in FIG. 3A and FIG. 3B.

An external force (eccentric load) acting on the first claw member 22 in a direction in which the claw member 22 is rotated within a horizontal plane is received by the first movable member 3 via the protrusion 98 and via the recess 99. This prevents wear of and/or damage to components of the first attaching-detaching mechanism 23 such as the connecting rod 53 due to the external force.

The protrusion 98 and the recess 99 also have the function of preventing the rotation of the first claw member 22 relative to the first movable member 3.

Figure 5A:
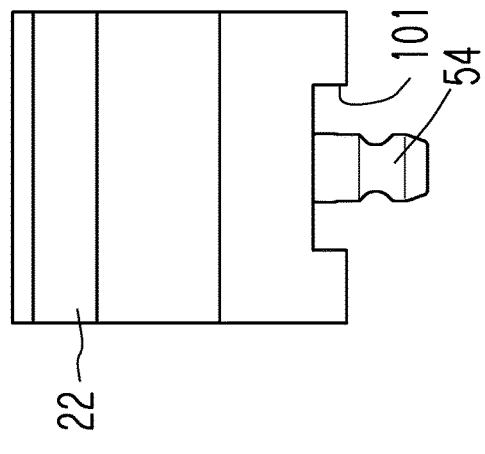
FIG. 5A is a diagram illustrating still another modification of the above embodiment and corresponding to FIG. 2A.
Figure 5A:
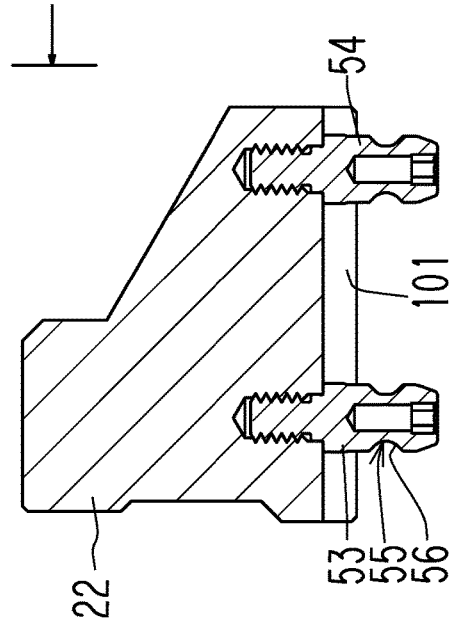
Figure 5B:
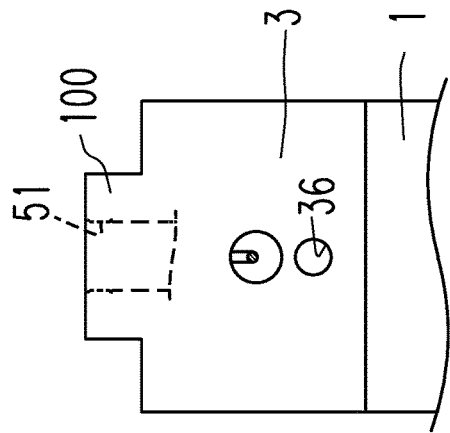
FIG. 5B is a cross section taken along a line 5B-5B in FIG. 5A.
Figure 5B:
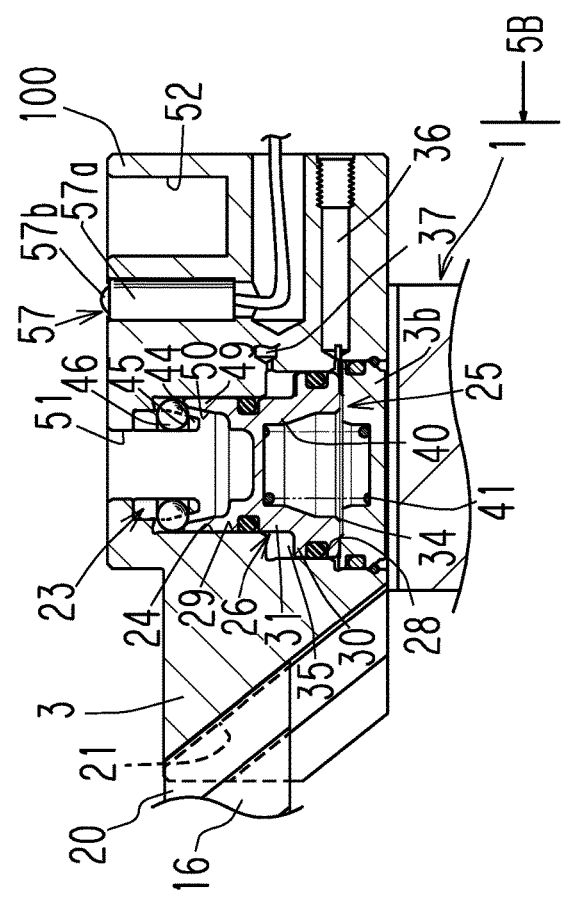

FIG. 5A and FIG. 5B show still another modification of the above-described embodiment of the present invention. In this modification, components the same as or similar to the components in the above-described embodiment are given the same reference numerals, in principle.

The modification shown in FIG. 5A and FIG. 5B is different from the above-described embodiment in the following points.

A guide projection 100 extending in a moving direction of the first movable member 3 is provided on the top surface of the first movable member 3. Furthermore, a groove 101 into which the guide projection 100 is to be fitted is provided on the under surface of the first claw member 22. Note that the second attaching-detaching mechanism 63 has the same structures as above.

This modification provides the following advantages.

An external force (eccentric load) acting on the first claw member 22 in a direction in which the claw member 22 is rotated within a horizontal plane is received by the first movable member 3 via the groove 101 and via the guide projection 100. This prevents wear of and/or damage to components of the first attaching-detaching mechanism 23 such as the connecting rod 53 due to the external force.

The groove 101 and the guide projection 100 also have the function of preventing the rotation of the first claw member 22 relative to the first movable member 3.

The above-described embodiments are changeable as follows.

In the above-described embodiment, the claw members 22 and 62 are brought to the main body 1 of the gripping device from a position above the gripping device by some conveyance device or manually. Instead of this, the gripping device may be brought to the claw members 22 and 62 placed on a table or the like, by some conveyance device (a robot) or manually, from a position above the claw members 22 and 62.

The gripping device may be mounted on a stationary stand such as a table, instead of being provided to a leading end of an arm of a robot.

The structure of the driving means 2, 25, and 65 may be altered: instead of the structure in which the holding springs 14, 41, and 81 are respectively attached in the actuation chambers (the clamp chamber 10 and lock chambers 34 and 74), release springs may be respectively attached in other actuation chambers (the unclamp chamber 11 and release chamber 35 and 75).

Each of the driving means 2, 25, and 65 may be of a single-acting cylinder, instead of a double-acting cylinder. Furthermore, each driving means 2, 25, 65 may be a hydraulic cylinder or an electrical actuator, instead of the pneumatic cylinder described by way of example.

The shape of the support members 44 and 84 and the shape of the operation portions 49 and 89 are not limited to the tubular shape, and may be another shape.

In the embodiments (modifications) shown in FIG. 3A to FIG. 4B, the protrusion 58, 98 is provided to the claw member 22, and the recess 59, 99 is provided to the movable member 3. Contrary to this, such a recess may be provided to the claw member 22 while such a protrusion may be provided to the movable member 3.

In the embodiment (modification) shown in FIG. 5A and FIG. 5B, the guide projection 100 is provided to the movable member 3 and the groove 101 is provided to the claw member 22. Contrary to this, such a groove may be provided to the movable member 3 while such a guide projection may be provided to the claw member 22.

Moreover, it is a matter of course that other changes or alterations can be made on the present invention within the scope of envisagement of one skilled in the art.

REFERENCE SIGNS LIST

1: main body; 2: driving means; 3: movable member; 4: movable member; 22: claw member (first claw member); 23: attaching-detaching mechanism (first attaching-detaching mechanism); 24: guide hole (cylinder hole); 25: attaching-detaching driving means (first driving means); 41: holding spring; 44: support member; 45: support hole; 46: engagement member (engagement ball); 49: operation portion; 50: wedge portion (wedge surface); 53: connecting rod; 56: lock portion; 58: protrusion 59: recess 62: claw member (second claw member) 63: attaching-detaching mechanism (second attaching-detaching mechanism) 64: guide hole (cylinder hole); 65: attaching-detaching driving means (second driving means); 81: holding spring; 84: support member; 85: support hole; 86: engagement member; 89: operation portion; 90: wedge portion; 93: connecting rod; 96: lock portion; 98: protrusion; 99: recess; 100: guide projection; 101: groove.

The invention claimed is:
1. A gripping device with an attaching-detaching mechanism, the gripping device comprising:

a driving means provided in a main body of the gripping device;

a movable member provided at a leading end portion of the main body so as to be movable in a horizontal direction by the driving means; and the attaching-detaching mechanism configured to detachably connect a claw member to the movable member, the claw member being configured to be contactable with a to-be-gripped object, the attaching-detaching mechanism being provided between the movable member and the claw member, wherein the attaching-detaching mechanism comprises:

a guide hole provided to the movable member so as to extend in a direction crossing the horizontal direction;

a tubular support member provided to protrude from the movable member into the guide hole;

support holes radially passing through a tubular wall of the support member and provided at predetermined intervals in a circumferential direction;

engagement members respectively inserted in the support holes so as to be radially movable;

an operation portion inserted in the guide hole so as to be movable in an axial direction by an attaching-detaching driving means provided in the movable member;

wedge portions provided on an inner peripheral wall of the operation portion so as to be engaged with the respective engagement members;

a connecting rod provided to protrude from the claw member and configured to be insertable into a tubular hole of the support member; and a lock portion provided on an outer peripheral wall of the connecting rod so that a distance between the lock portion and an axis of the connecting rod decreases toward a leading end side, the lock portion being configured to be contactable with the engagement members.

2. The gripping device with the attaching-detaching mechanism according to claim 1, wherein:

a holding spring is provided in the guide hole; and the holding spring is configured to bias the engagement members radially inward via the operation portion.

3. The gripping device with the attaching-detaching mechanism according to claim 1, wherein:

a protrusion is provided to either one of the movable member and the claw member; and a recess into which the protrusion is to be fitted is provided to an other of the movable member and the claw member.

4. The gripping device with the attaching-detaching mechanism according to claim 3, wherein the protrusion has a cylindrical shape.

5. The gripping device with the attaching-detaching mechanism according to claim 3, wherein the protrusion has a quadrangular shape.

6. The gripping device with the attaching-detaching mechanism according to claim 1, wherein:

a guide projection extending in a moving direction of the movable member is provided to either one of the movable member and the claw member; and a groove into which the guide projection is to be fitted is provided to an other of the movable member and the claw member.

\* \* \* \* \*